United States Patent [19]

Higuchi

[11] 4,434,395
[45] Feb. 28, 1984

[54] SOLAR CELL POWER SUPPLY CIRCUIT

[75] Inventor: Masayuki Higuchi, Ueno, Japan

[73] Assignee: Sharp Kabushiki Kaisha, Osaka, Japan

[21] Appl. No.: 352,154

[22] Filed: Feb. 25, 1982

[30] Foreign Application Priority Data

| Feb. 25, 1981 [JP] | Japan | 56-27387 |
| Feb. 25, 1981 [JP] | Japan | 56-27388 |
| Mar. 30, 1981 [JP] | Japan | 56-47957 |

[51] Int. Cl.$^3$ .................................................. H02J 9/00
[52] U.S. Cl. ......................................... 320/1; 136/293; 307/64
[58] Field of Search ............... 307/64, 65, 66; 320/1, 320/2; 136/292, 293

[56] References Cited

U.S. PATENT DOCUMENTS

| 3,419,779 | 12/1968 | Zehner | 307/66 X |
| 3,784,841 | 1/1974 | Hosaka | 307/64 |
| 4,145,618 | 3/1979 | Restori et al. | 320/1 X |
| 4,227,257 | 10/1980 | Sato | 307/64 X |

Primary Examiner—William M. Shoop
Attorney, Agent, or Firm—Birch, Stewart, Kolasch & Birch

[57] ABSTRACT

A solar cell power supply circuit for use in a calculator or equipment is disclosed. It includes a solar cell or cells, a back-up capacitor connected to the solar cells, and a circuit element connected to be responsive whether the electromotive force from the solar cells lies within a range of operation for a load element of the solar cells, typically an LSI semiconductor device. The back-up capacitor starts charging when the electromotive force of the solar cells falls out of the range of operation for the load element. Preferably, an alarm sound is delivered when the electromotive force of the solar cells is poor.

7 Claims, 10 Drawing Figures

(a)

(b)

SOLAR CELL POWER SUPPLY CIRCUIT

BACKGROUND OF THE INVENTION

This invention relates to a solar cell power supply circuit.

Lately, with the advent of very low power LSI elements, solar cell powered equipment such as solar cell calculators and wristwatches have been in increasing use to fulfill the demand for savings of power. However, this equipment, for example, solar cell calculators has the disadvantage that information will disappear during the process of calculation when incident light to a solar cell or cells is blocked. There are two measures to overcome this disadvantage: (1) a back-up capacitor is connected in parallel with the solar cells to temporarily protect operation of the LSI element or the solar cells, load especially when incident light to the solar cells is blocked; and (2) a back-up battery or batteries are installed in the equipment to energize the same when incident light is shut off. Those measures have been considered as unsatisfactory as follows.

In the circuit method (1) (see FIG. 1)

As shown in FIG. 1, the back-up capacitor $C_1$ is provided in parallel relationship with the solar cells SB and serves to compensate for interrupted incident light to the solar cells SB. There are further provided voltage-stabilizing LEDs ($D_1$ and $D_2$) in parallel relationship with the capacitor $C_1$ to prevent the LSI element from being suppled with an overvoltage when a very large amount of incident light is applied to the solar cells SB. In other words, the LEDs $D_1$ and $D_2$ stabilize the output voltage of the solar cells SB. In this circuit, when the output voltage of the solar cells SB reduces to zero the capacitor $C_1$ makes up for a deficiency of voltage necessary for the driving of the equipment when the incident light to the solar cells SB is blocked. The back-up capacitor $C_1$ therefore protects operation of the LSI element when the incident light is shut off. To lengthen the operational life of the equipment, it is necessary to employ a back-up capacitor $C_1$ having a capacitance as high as possible. Nevertheless, it takes a long time to make the equipment ready to operate after the equipment is removed from the dark and subjected to solar or other radiation. That is, in the event that the equipment is moved somewhere from the dark with no charge on the capacitor $C_1$, it will take a considerable amount of time for the output voltage of the solar cells to reach a voltage level necessary to enable the voltage at the back-up capacitor $C_1$ to drive the LSI element and the operator is unable to use the equipment for this period of time. The length $T_1$ of time required for making the equipment ready to operate (hereinafter this is referred to as "recovery time") can be defined approximately as follows:

$$T_1 = (C_1 \cdot V)/(I \cdot A) \quad (1)$$

where $C_1$ the capacitance of the back-up capacitor

V the voltage to be supplied to the LSI element for normal operation of the equipment A the brightness of the incident light to the solar cells the output current of the solar cells illuminated with the brightness A Equation (1) indicates that shortening the recovery time $T_1$ requires decreasing $C_1$ and V and increasing I and A, in which case such a decrease in $C_1$ causes deteriorating the primary performance of the back-up capacitor and such a decrease in V leads to a yield drop and cost increase in the manufacture of the LSI elements. Further, an increase of A limits correspondingly the range of brightness usable with the solar cell-powered equipment and an increase of I demands an increase in the area of the solar cells. The solar cells are generally more expensive than conventional batteries and the requirement for an increase in the area of the solar cells leads to greater expensive.

In the circuit method (2) (see FIG. 2)

This method relies upon the use of the back-up batteries for protecting operation of the equipment when the incident light is temporarily shut off. The back-up batteries are generally classified as primary batteries (cf. FIG. 2a) and secondary batteries (cf. FIG. 2b). With the former, a diode D is inserted to prevent charging of the primary batteries $E_1$ with the electromotive force from the solar cells SB and the LSI element is powered by the primary batteries $E_1$ when the electromotive force from the solar cells SB falls. With the latter, when the electromotive force of the solar cells SB is large, solar energy charges the seconary batteries $E_2$ (typically, Ni-Cd batteries) by way of a charging current limiting resistor R and supplies power to the LSI element. In this method, the batteries have a limited life and need be exchanged with new ones, whether the back-up batteries used are the secondary batteries (the Ni-Cd batteries) or the conventional primary batteries. This impairs severely the inherent and outstanding advantages of the solar cells that they exhibit substantially unlimited useful life.

OBJECT AND SUMMARY OF THE INVENTION

Accordingly, it is an object of the present invention to provide a solar cell power supply circuit which overcomes the above discussed problems with the conventional methods.

It is another object of the present invention to provide a solar cell power supply circuit which may back up operation of a circuit element being powered directly with a solar cell or cells when incident light to the solar cells is shut off temporarily.

According to the present invention, there is provided a solar cell power supply circuit comprising a solar cell or solar cells, a back-up capacitor connected to said solar cells, first circuit means for deciding whether the electromotive force from said solar cells lies within a range of operation of a load for said solar cells, and second circuit means for charging said back-up capacitor when the electromotive force of said solar cells is over said range of the operation of said load. Preferably, said first circuit means includes a switch element which becomes conductive when the electromotive force from said solar cells is over said range of the

BRIEF DESCRIPTION OF THE DRAWINGS

For a more complete understanding of the present invention and for further objects and advantages thereof, reference is now made to the following description taken in conjunction with the accompanying drawings, in which.

DETAILED DESCRIPTION OF THE INVENTION

Figure 3:
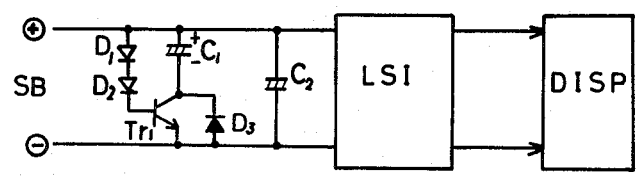
FIG. 3 is a circuit diagram of a solar cell power supply circuit with backup features according to an embodiment of the present invention.

Referring now to FIG. 3, there is illustrated an improved solar cell power circuit with back-up features according to an embodiment of the present invention, which circuit generally includes a solar cell or cells SB, LEDs $D_1$ and $D_2$ for stabilizing the output voltage of the solar cells, a pair of back-up capacitors $C_1$ and $C_2$ and a diode $D_3$. In view of the fact that incident light on the solar cells varies in intensity depending upon the surrounding atmosphere of the solar cells from time to time, this circuit arrangment is designed such that it allows the back-up capacitor $C_1$ to be charged only when incident light to the solar cells is strong enough to activate an LSI element to be powered by the solar cells SB. Further, a charging path for the back-up capacitor is provided independently of an enabling power voltage supply for the LSI element. Upon application of an excessive amount of the incident light, current begins flowing through the voltage-stabilizing LEDs $D_1$ and $D_2$, charging the back-up capacitor $C_1$ by way of a transistor $Tr_1$.

Should the solar cells be moved from the dark and exposed to solar radiations under the condition where the charge on the back-up capacitor $C_1$ is zero, the length of time required for the output voltage of the solar cells to reach a voltage level necessary to drive the LSI element as a load of the solar cells depends on the charging time of the back-up capacitor $C_2$ rather than that of the back-up capacitor $C_1$. The capacitance of the back-up capacitor $C_1$, therefore, may be selected at a higher value freely from the length of time necessary for placing the LSI element into ready state.

It is understood that the back-up capacitor $C_2$ is effective as a measure to safeguard operation of the equipment powered by the solar cells against the dark atmosphere where the quantity of the incident light is faint and insufficient to charge the capacitor $C_1$ and the capacitance of $C_2$ is thus correlated as $C_1 >> C_2$.

In the event that the back-up capacitor $C_1$ has fully been charged and the incident light on the solar cells is screened, the capacitor $C_1$ backs up the LSI element through the diode $D_3$. The diode $D_3$ feeds the charge on the back-up capacitor $C_1$ to the LSI element.

Figure 4:
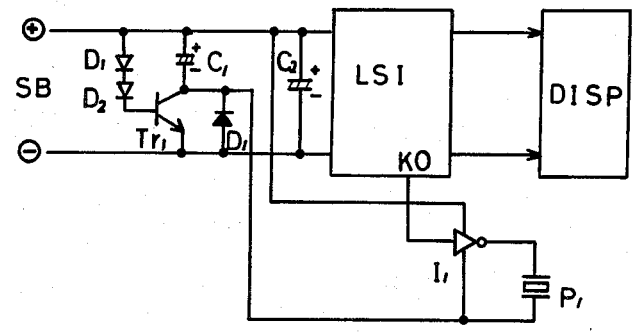
FIG. 4 is a circuit diagram of another embodiment of the present invention.

FIG. 4 illustrates another embodiment of the present invention wherein components similar to those in the previous embodiment are identified by the same reference numbers. There are provided additionally a piezoelectric buzzer $P_1$ and an inverter $I_1$ for enabling the piezo-electric buzzer. In this circuit, the back-up capacitor $C_1$ is used as a major power supply source for charging the back-up capacitor $C_1$. When an instruction is given by a particular terminal K of the LSI element for enabling the piezo-electric buzzer $P_1$, the back-up capacitor $C_1$ compensates for enabling current for the piezo-electric buzzer in the absence of a output voltage of the solar cells high enough to enable the piezo-electric buzzer $P_1$ due to insufficient incident light.

As a result, the LSI element or other components to be powered directly by the solar cells are backed up even when the incident light on the solar cells is temporarily screened. It is further possible to shorten greatly the length of time necessary for making the equipment ready to operate, without decreasing the capacitance of the back-up capacitor or deteriorating yield LSI manufacture and with a minimum of the area of solar cells.

Figure 1:
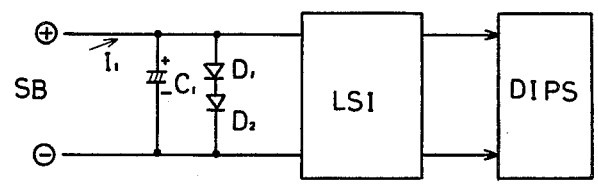
FIGS. 1 and 2 are circuit diagrams of conventional solar cell power supply circuits.
Figure 2:
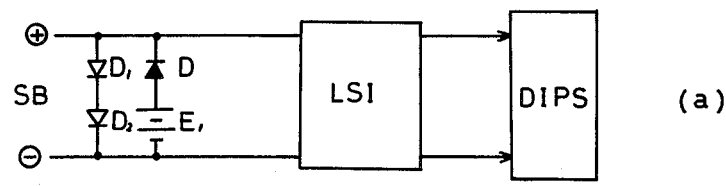
Figure 2:
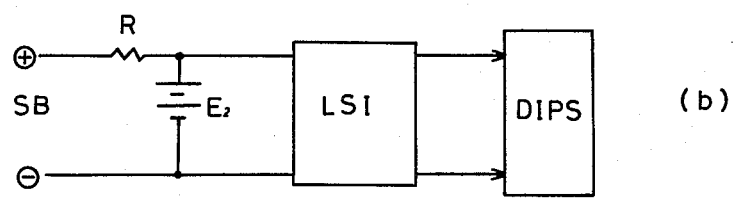
Figure 5:
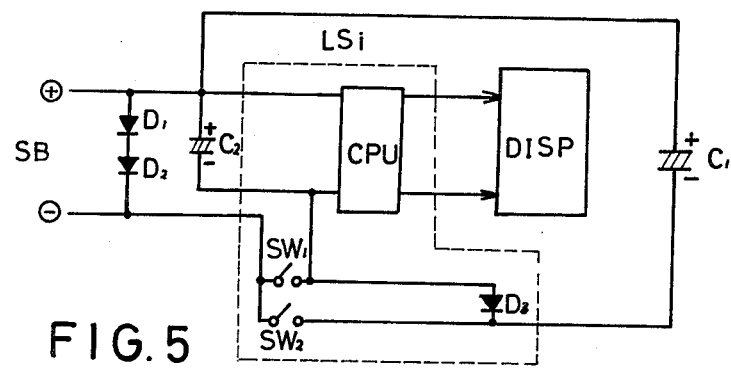
FIGS. 5 and 6 are circuit diagrams of other embodiments of the invention.

FIG. 5 shows another embodiment of the present invention wherein components similar to the above embodiments are designated by the same reference numbers. A diode $D_3$ is a build-in diode of the LSI element and switch elements $SW_1$ and $SW_2$ are also built-in components of the LSI element and made typically of conventional MOS-FETs. The back-up capacitors $C_1$ and $C_2$ are correlated as $C_1 >> C_2$. When the equipment is removed from the dark, the switch element $SW_1$ in the LSI element is closed and the other is open so that the output of the solar cells SB charges the capacitor $C_2$. In this instance, the capacitance of the capacitor $C_2$ is selected such that the output of the solar cells may complete charging the same for a short period of time. If $C_2$ has been charged over a high level enough to drive the LSI element in normal manner, then the built-in switching elements $SW_1$ and $SW_2$ are switched in such a manner that $SW_2$ changes to open position or to closed position when $SW_1$ is in open position or closed position, respectively. A central processing unit CPU in the LSI element operates to keep at approximately 9:1 the ratio of the period of time where $SW_1$ stands in open position to that where $SW_2$ stands in closed position. In other words, the capacitor $C_1$ starts being charged at the moment where a voltage applied to the LSI element exceeds the level necessary for stand-by of the LSI element. The length of time necessary to complete the charging of the capacitor $C_1$ is ten times as long as that in the conventional circuit of FIG. 1. However, since operation of the LSI element is backed up by the back-up capacitor $C_2$ while $C_1$ is being charged, the equipment becomes operative immediately after it has been fetched from the dark, without waiting for the back-up capacitor $C_1$ to be fully charged. The capacitance of the capacitor $C_1$ can be selected at a high value, regardless of the length of the stand-by period of the LSI element. After the charging of the back-up capacitor $C_1$ is completed in the above described manner, the capacitor $C_1$ guarantees stable and reliable operation of the LSI element via the diode $D_3$.

Figure 6:
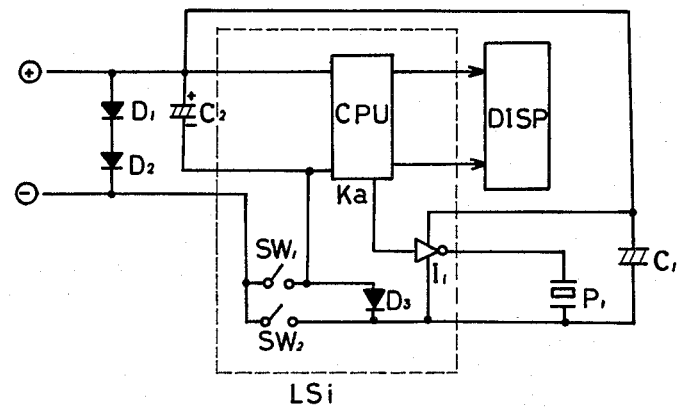
Figure 7:
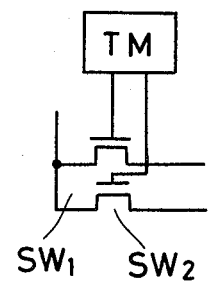
FIG. 7 is a schematic circuit view of switch elements included in the embodiments of FIGS. 5 and 6.

FIG. 6 illustrates another embodiment which is analogous to the embodiments of FIG. 4 and FIG. 5, wherein components similar to those in FIGS. 4 and 5 are designated by the same reference numbers. An enable signal $K_a$ is given by the CPU for driving the piezoelectric buzzer $P_1$ via the inverter $I_1$. The back-up capacitor $C_1$ supplements enabling current for driving the buzzer $P_1$ even when the output voltage of the solar cells is insufficient.

As set forth previously, the switching elements $SW_1$ and $SW_2$ shown in FIGS. 5 and 6 are contained in the LSI element and switched on and off at a duty ratio of 9:1. Those elements may be implemented with MOS transistor transfer gates. A timing signal generator TM is further provided.

Figure 8:
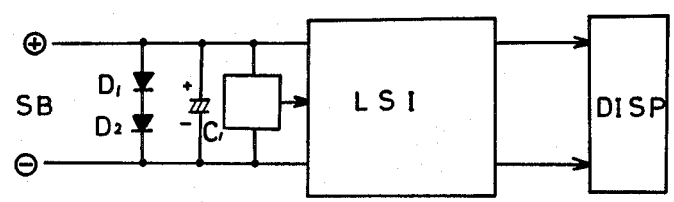
FIGS. 8 and 10 are views showing still another embodiment of the present invention.
Figure 9:
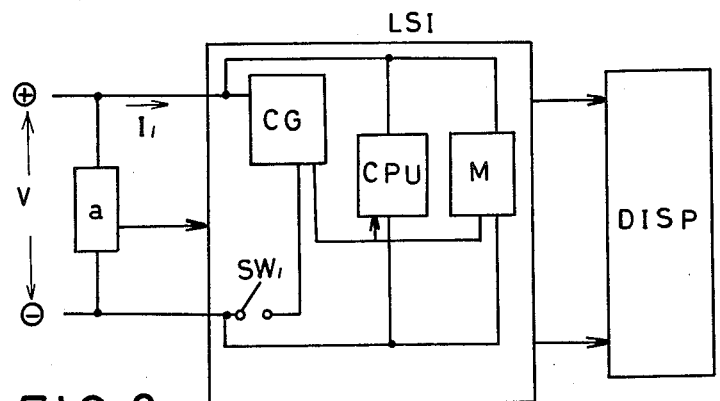
Figure 10:
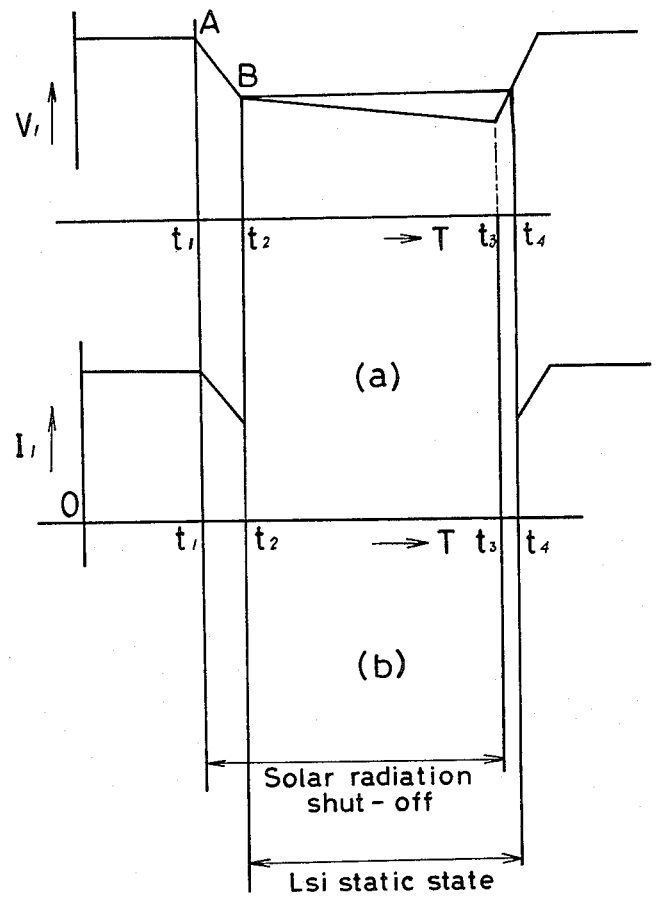

FIGS. 8 through 10 show another embodiment which includes a supply voltage detector a, a clock generator CG, a memory element M and a display panel DISP. The voltage detector a develops a voltage to disable the clock signal generator CG when incident light on the solar cells is shut off. Especially, when the incident light is shut off and the applied voltage $V_1$ decreases from a level A to a level B as seen in FIG. 10, the voltage detector a becomes operative and the switching element $SW_1$ is opened to disable the generator CG. Under the disabled state of the generator CG the LSI element stands in the so-called static state with little or no current $I_1$ flowing therethrough (see FIG. 10b) as long as it is made up of C-MOS devices. As long as the LSI element is in the static state, it is held in the internal state envisaged before the clock signal generator CG is disabled, because the CPU and the memory element M are supplied with back-up voltage of the capacitor $C_1$. When solar radiation impinges on the solar cells and the voltage $V_1$ reaches the level B in FIG. 10 under the static state of the LSI element, the built-in switch $SW_1$ is closed to start the clock signal generator CG and place the LSI element into the static state. Under these circumstances, the LSI element is in the internal state as viewed prior to the interrupted operation of the clock generator CG.

While only certain embodiments of the present invention have been described, it will be apparent to those skilled in the art that various changes and modifications may be made therein without departing from the spirit and scope of the invention as claimed.

What is claimed is:

1. A solar cell power supply circuit comprising:
    a solar cell or cells;
    a first back-up capacitor connected to said solar cells;
    first circuit means for deciding whether the electromotive force developed by said solar cells lies within a range of operation for a load of said solar cells;
    second circuit means responsive to said first circuit means for charging said first back-up capacitor when the electromotive force of said solar cells is over said range of operation for said load; and
    a second back-up capacitor for supplementing the operation of said first back-up capacitor when only a minimum of incident light is available for said solar cells.

2. A solar cell power supply circuit according to claim 1 wherein said second circuit means includes a switch element which becomes conductive when the electromotive force from said solar cells is over said range of operation.

3. A solar cell power supply circuit according to claim 1 wherein the capacitance of said first back-up capacitor is greater than that of said second back-up capacitor.

4. A solar cell power supply circuit according to claim 1 further comprising sounding means enabled by said back-up capacitor for providing an alarm sound when the incident light is insufficient.

5. A solar cell power supply circuit comprising:
    a solar cell or cells;
    a first back-up capacitor connected to said solar cells;
    a second back-up capacitor which may be fully charged in a shorter period of time than the time necessary to change said first back-up capacitor;
    a load element connected to be driven by said solar cells, said first back-up capacitor or said second back-up capacitor;
    switching circuit means for charging said first back-up capacitor when said second back-up capacitor is fully charged and said load element is supplied with a sufficient voltage level necessary for its normal operation, wherein said load element is backed up with said second back-up capacitor while said first back-up capacitor is being charged.

6. A solar cell power supply circuit according to claim 5 wherein said switching circuit means includes a pair of switching elements with one said switching element interposed in a charging circuit for said first back-up capacitor and the other said switching element interposed in a charging circuit for said second back-up capacitor.

7. A solar cell power supply circuit comprising:
    a solar cell or cells;
    a load element connected to be driven by said solar cells, said load element including a clock generator;
    a back-up capacitor connected to said solar cells for backing up operation of said load element when incident light is poor;
    voltage detector circuit means for deciding whether the output voltage from said solar cells lies within a range of operation for said load element; and
    control circuit means for inhibiting said clock generator contained in said load element from operating and thus placing said load element into a static state in response to the output of said voltage detector circuit means when the output voltage of said solar cells falls out of said range of operation for said load element.

* * * * *